June 11, 1935.  A. D. EITZEN  2,004,103
STOCK QUOTATION PROJECTING MACHINE
Original Filed July 1, 1932
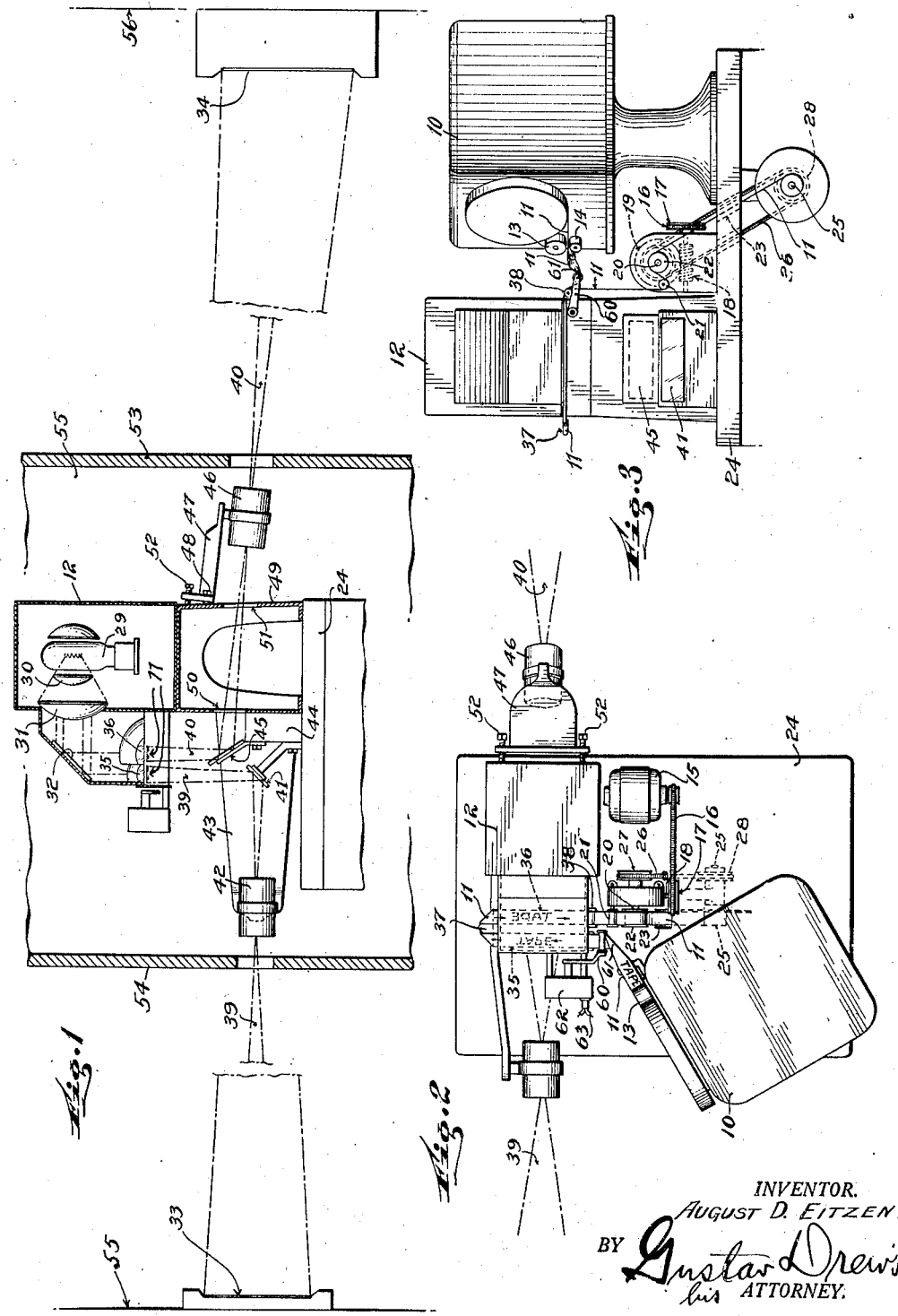
INVENTOR.
AUGUST D. EITZEN
BY Gustav Drews
his ATTORNEY.

Patented June 11, 1935

2,004,103

UNITED STATES PATENT OFFICE 2,004,103

STOCK QUOTATION PROJECTING MACHINE

August D. Eitzen, Rockville Centre, N. Y., assignor to News Projection Corporation, New York, N. Y., a corporation of New York Application July 1, 1932, Serial No. 620,347
Renewed September 11, 1934

12 Claims. (Cl. 88—24)

My present invention relates generally to stock ticker apparatus, and has particular reference to an improved type of stock quotation projecting machine.

It is frequently desirable to project images of the markings on a tape discharged from a stock ticker upon screens commanding two or more different observation areas. For example, it may in certain cases be desirable to display these markings in two rooms reserved respectively for men and women, or it may be desirable to project the markings toward a main observation area and also toward or into a private office or the like.

It is an object of my present invention to provide a projection machine which permits of the foregoing dual display, and it is a particular object to provide an apparatus which embodies a maximum of simplicity and a minimum of expense.

Inasmuch as stock tickers and projecting devices are comparatively expensive in certain localities, whether bought or rented, it is a particular object of my present invention to provide for a multiple display of the tape markings without recourse to more than a single stock ticker and a single projecting device of normal character.

It is a particular feature of my invention, pursuant to the foregoing general objects, to provide a projecting device which is so constructed that the single source of light customarily embodied therein may be employed to the greatest advantage in creating two distinct and differently directable beams of light, by means of a pair of outlet apertures provided with means for drawing the tape successively across these two apertures, embodying in that respect the invention disclosed and claimed generically in my copending application Serial No. 390,371, upon which my present invention is in the nature of an improvement.

More particularly, I provide for equipment of the light apertures with a pair of condenser lenses so arranged as to produce a pair of light beams each composed of converging rays, the axes of the emergent beams being substantially parallel, but the adjacent inner ray components of the two beams diverging from a plane between the beams and parallel to their axes.

A further feature of my invention lies in the provision of a pair of mirrors disposed each in the path of one of said emergent beams at a region where said beams are closely associated, but where the aforesaid divergence of the inner adjacent rays of the beams from the medial plane makes it possible to dispose the mirrors very compactly with their inner margins nearer to said plane than the inner rays of either beam, the mirrors having their reflecting surfaces diverging from the plane so that the beams are directed divergently from each other, either in diametrically opposite directions or at any desired and suitable angle of divergence.

A further object of the invention is to provide, in combination with the light apertures and mirrors associated as above described, an objective lens for each beam and so arranged that with a single mirror and single objective lens for each of the divergent beams the latter may be directed upon one of a pair of spaced screens, no further reflecting medium or lens being necessary to provide for the production upon each screen of an uninverted image of the markings upon the tape.

Still another important object of the invention is the provision of a pair of mirrors for the above purpose which are disposed at different angles relatively to said medial plane and arranged at different distances from the objectives and from the light apertures, but in close juxtaposition with each other, so as to permit operation with great economy of space, one of the beams of light being preferably deflected in a direction normal to its screen, while another of the light beams, directed to a more remote screen, is so deflected as to be projected upon its screen at an angle somewhat removed from the normal.

Another feature of the invention is the provision of a compact assembly including the ticker, the source of light, the pair of outlet apertures with their equipment of condenser lenses, the tape feeding mechanism and the cooperating pair of mirrors and pair of objective lenses, all associated closely upon a base so that the entire assembly of cooperating instrumentalities above mentioned can be fabricated in a manufactory and shipped as a unitary structure for installation as such with a minimum amount of adjustment and with only average skill on the part of the workman making the installation.

A cognate feature is the provision of rewinding mechanism mounted in part at least upon the under side of the base, where it is out of the way, but sufficiently accessible for inspection and removal of the accumulated tape.

For the attainment of the foregoing objects and such other objects as may hereinafter appear or be pointed out, I have illustrated several forms of my invention in the accompanying drawing, wherein—

Figure 1 is a view in vertical section, largely diagrammatic, of a machine embodying the features of my present invention;

Fig. 2 is a plan view of said machine of Fig. 1;

Fig. 3 is an elevational view of said machine.

Referring to the drawing, I will point out that I have shown a stock ticker 10 of usual construction adapted to discharge a marked tape 11, the latter being guided into a projecting device 12, upon its discharge from the printing couple 13 and 14. In accordance with my present invention, the tape 11 leaves the projecting device at the same side at which it enters, and I have illustratively shown the manner in which this tape may be led from the projecting device 12 toward a suitable tape-pulling and rewinding mechanism. The latter may embody a source of power such as the motor 15 which drives a belt 16, the latter running over and rotating a pulley 17, and thereby driving a worm-shaft 18, which meshes with a worm-gear 19 on the shaft 20 of the tape-puller. The tape 11 may be made to pass downwardly beneath the guide roller 21, then upwardly around a pulley 22 on the shaft 20, then downwardly through an aperture 23 in the table-top 24, and where the tape is to be rewound, it may then pass onto a mandrel 25. The latter may be rotated or driven from the shaft 20 by means of the belt 26, running between pulleys 27 and 28 on the shaft 20 and mandrel 25, respectively.

It is to be observed that this assembly of the elements above described makes it possible to dispose the rewinding mechanism largely below the table-top 24, which is a desirable arrangement as it removes that portion of the apparatus from view, but leaves it sufficiently convenient for purposes of inspection, adjustment and access to the mandrel from time to time when it is desirable to remove the used tape therefrom.

In Figure 1 I have shown the possible arrangement within the projecting device 12 of a single source of light 29 adapted to project a beam of light through a pair of condensing lenses 30 and 31, this beam being thereupon reflected into a downward direction by means of a mirror 32. Below the mirror 32 the usual outlet aperture for the light beam is arranged, and this aperture may advantageously be of the type disclosed and claimed in my co-pending application Serial No. 390,371, and which will be more fully described hereinafter.

In Fig. 1 I have also shown the arrangement of two screens 33 and 34 facing in opposite directions and being adapted thereby to serve different observation areas.

Immediately below the center of the beam directed downwardly by the mirror 32 I arrange two outlet apertures 35 and 36, most clearly shown in Fig. 2. These apertures are preferably equipped with cut condenser lenses arranged in mutual parallelism and alongside of each other, and the two apertures are in effect a single aperture of a width substantially twice that of the tape. In accordance with my invention, the tape 11 is drawn through the projecting device in such a manner that it will successively pass across the two apertures 35 and 36. Referring to Fig. 2, it will be seen that the tape 11, upon entering the projecting device, passes across the aperture 35. At the opposite end of the projecting device, the tape-reversing guide 37 directs the tape downwardly and toward the right-hand, thence upwardly again and across the aperture 36 in reverse direction. The guide 37 is so positioned and shaped that the tape will be accurately guided over the aperture 36 in its return passage through the projecting device. The tape then leaves the projecting device by passing over the guide roller or the like 38. A more detailed description of a guide such as that shown at 37 will be found in my said application Serial No. 390,371.

Referring again to Fig. 1, it will be seen that the provision of two apertures in the foregoing manner results in the creation of two light beams 39 and 40, passing downwardly from the apertures 35 and 36 respectively. For projecting the light beam 39 onto the face of the screen 33, I provide a mirror 41 which deflects the beam 39 laterally through an objective lens 42 onto the screen 33, which in the instance illustrated is of the "front throw" type although any suitable form of screen may be used.

The lens 42 is supported by a suitable bracket 43 secured to a block 44 mounted on the table 24.

For projecting the beam 40 onto the face of the screen 34 I provide a mirror 45 mounted on the block 44 and which deflects the beam 40 laterally through an objective lens 46, which serves to direct the beam onto the screen 34, this screen being in this instance also a "front throw" screen facing in the opposite direction from the screen 33 and commanding a different observation area.

Fig. 1 illustrates a practical embodiment of my invention, in which 55 designates a cabinet containing the various instruments described, and having walls or partitions 53 and 54 separating a main room at the right from a private office at the left. For example, 55 may represent a wall in the private office and 56 a wall in the "board room." A suitable table or base 24 supports the ticker 10 and the tape-pulling mechanism; also apparatus of the character hereinbefore described in greater detail, all co-operating to project the markings not only upon the screen 33 mounted on the wall 55 and facing the room at the right of the wall, but also onto the screen 34 facing toward the left and displaying the markings toward the larger observation area. The objective lenses 42 and 46 may be of suitably different focal length to serve the respective observation areas, and in the instance illustrated the lens 42 is a sixteen inch objective and the lens 46 is a twenty inch objective.

While it is true that the markings projected upon the screen 34 will be those which already have been projected upon the screen 33, this slight delay is not sufficient to outweigh the great advantages achieved by non-duplication of expensive apparatus. As a matter of fact, the amount by which the second screen displays are behind the displays of the first screen is extremely slight, as will be appreciated upon reference to Fig. 2, wherein it is clear that the tape is guided in the most direct manner across the two apertures successively.

It is to be particularly noted that in my present invention I have provided for an extremely compact organization of the essential elements in a dual projection apparatus for the purpose of throwing the images upon two widely spaced screens in which there is a maximum amount of light on each screen. This becomes readily apparent upon examination of Fig. 1, which shows the closely associated manner in which the beams 39 and 40 proceed side by side from the closely associated light apertures 35 and 36.

The light rays composing these beams are convergent in each beam, owing to the action of the cut condensers, and it will be noticed that the mirrors 41 and 45 have been placed very nearly in overlapping relation to take advantage of the ray divergence between the two beams. This is further made possible by somewhat tilting the mirror 45 away from the path of the beam 39 so that the beam 40 is given a slightly downward direction as it passes through the objective lens 46 and on to the screen 34.

It may be noted that the actual distance, in the particular instance illustrated, between the objective lens 46 and the screen 34 is in the neighborhood of two hundred and eighty-one inches, so that it makes but little difference that the beam 40 impinges upon the face of screen 34 at an angle slightly removed from normal.

It is also a valuable feature of the present invention that there is only a single mirror and a single objective lens in the path of each of the beams 39 and 40, so that there is minimum absorption of light and a maximum economy of space. All of the operating instrumentalities of the machine are contained in the compass of the cabinet 52, and this constitutes a notable improvement over the prior art, for one reason, among others, that in the installation of this improved machine, the entire assembly can be fabricated in the manufactory and can be installed as a unitary structure, the simple placing of the "front throw" screens 33 and 34 being an operation within the capacity of a relatively unskilled workman.

It will be noted that the tape 11, at the region of its emergence from the ticker 10 is given a half turn before entering the projector and passing below the light aperture 35, so that the markings which conventionally are visible upon the upper surface of the emerging tape, reading in the order with which they emerge, are given an inverted position during their progress below the light aperture 35 and upon their journey in reverse direction below the light aperture 36. This is the proper position for projection and the above description will be sufficient in view of the fact that this feature does not constitute a novel part of my present invention but forms the subject of a disclosure and claims in my co-pending application, Serial No. 434,538, which matured into Patent No. 1,908,832 to which reference may be had for a more detailed description.

So also, it is not necessary to describe in detail the action of the lever 60, best seen in Figs. 2 and 3, which cooperates with the variable loop 61 formed in the tape 11 at a point between the ticker 10 and projector 12, for the purpose of co-ordinating, through a switch 62 and suitable electrical conductors 63, the operation of the tape puller 12 with that of the ticker by stopping and starting the motor 15 of the tape puller at appropriate intervals. Control mechanisms of this character are well-known to those skilled in the art.

I do not wish to limit myself to the provision of two apertures, nor to the particular parallel arrangement herein illustrated, although such arrangement has proven to be highly satisfactory.

Furthermore, it will be obvious that changes in the details herein described and illustrated for the purpose of explaining the nature of my invention may be made by those skilled in the art without departing from the spirit and scope of the invention, as expressed in the appended claims. It is therefore intended that these details be interpreted as illustrative and not in a limiting sense.

Having thus described my invention and illustrated its use, what I claim as new and desire to secure by Letters Patent is—

1. In a stock ticker projection machine, a ticker adapted to discharge marked tape, a projecting device including a common source of light for downwardly directing a beam of light and a pair of parallel outlet apertures for receiving said downwardly directed beam of light and dividing it into two subordinate light beams, a pair of oppositely facing front projection screens, means for drawing the tape successively across said apertures so that the tape is moving in opposite directions across said apertures, and means for projecting the light beam from each of said apertures onto one of said screens to produce uninverted images of said tape-markings upon said screens, respectively; said last named means comprising an objective lens and a single mirror for each light beam.

2. In a stock ticker projection machine, a ticker adapted to discharge marked tape, a projecting device including a common source of light for downwardly directing a beam of light and a pair of closely associated outlet apertures for receiving said downwardly directed beam of light and dividing it into two subordinate light beams, a pair of screens spaced from each other, means for drawing the tape successively across said apertures and means for projecting the light beam from each of said apertures onto one of said screens, said last named means comprising a pair of mirrors disposed each in the path of one of said emergent beams at a region where said beams are closely associated, said mirrors being arranged to direct said beams divergently from each other and each toward one of said screens, and an objective lens in the path of the deflected portion of each beam between each of said mirrors and its cooperating screen.

3. In a stock ticker projection machine, a ticker adapted to discharge marked tape, a projecting device including a common source of light for downwardly directing a beam of light and a pair of closely associated outlet apertures for receiving said downwardly directed beam of light and dividing it into two subordinate light beams, a pair of oppositely facing opaque screens spaced from each other, means for drawing the tape successively across said apertures and means for projecting the light beam from each of said apertures onto one of said screens, said last named means comprising a pair of mirrors disposed each in the path of one of said emergent beams at a region where said beams are closely associated, said mirrors being arranged to direct said beams divergently from each other and each toward one of said screens, and an objective lens in the path of the deflected portion of each beam between each of said mirrors and its cooperating screen.

4. A stock ticker projection machine comprising a ticker adapted to discharge marked tape, a projecting device including a common source of light for downwardly directing a beam of light and a plurality of closely associated outlet apertures therefor, equipped respectively with adjacently disposed cut condenser lenses for receiving said downwardly directed beam of light and dividing it into two subordinate light beams, means for drawing the tape successively across said apertures and means for projecting the light beam from each of said apertures onto one of a plurality of screens, said last named means comprising mirrors each disposed in the path of one of said emergent beams at a region where said beams are closely associated, said mirrors being arranged to direct each of said beams toward one of said screens, and an objective lens in the path of the deflected portion of each beam between each of said mirrors and its cooperating screen, said instrumentalities being all assembled upon a single base, and constituting a unitary structure for transportation and installation.

5. In a stock ticker projection machine, a ticker adapted to discharge marked tape, a projecting device including a common source of light for downwardly directing a beam of light and a pair of closely associated outlet apertures for receiving said downwardly directed beam of light and splitting it into two subordinate light beams, means for drawing the tape successively across said apertures and means for projecting the light beams, one from each of said apertures, onto a pair of spaced screens, said last named means comprising a pair of adjacently disposed cut condenser lenses each adapted to direct a narrow elongated beam of convergent light rays through one of said outlet apertures and the tape portion drawn across said aperture, said beams emerging from said apertures along parallel axes, and a pair of mirrors disposed each in the path of one of said emergent beams at a region where said beams are closely associated, said mirrors being arranged to direct said beams divergently from each other and each toward one of said screens, and an objective lens in the path of the deflected portion of each beam between each of said mirrors and its cooperating screen.

6. A stock ticker projecting machine, characterized by having as elements a ticker adapted to mark and discharge a tape, a projecting device including a common source of light for downwardly directing a beam of light and means adapted to direct a beam therefrom through one or more light-outlet apertures accessible from the top of the machine without interfering with the path of the light beams, a deflecting mirror and an objective lens in the path of the light beam emerging from each outlet aperture and adapted to direct said emergent beam upon a screen, means for drawing the tape across each outlet aperture, and a rewinding mechanism for said tape; said machine being further characterized by a base upon which said elements are supported, with said rewinding mechanism disposed in part at least below said base so that the finally wound roll of tape may be removed from below the base without interfering with the path of the light beams.

7. In a stock ticker projection machine, a ticker adapted to discharge marked tape, a projecting device including a common source of light for downwardly directing a beam of light and a pair of closely associated outlet apertures for receiving the downwardly directed beam of light and splitting it into two subordinate light beams, means for drawing the tape successively across said apertures and means for projecting a pair of light beams, one from each of said apertures onto a pair of spaced screens, respectively facing said projecting means, said last named means comprising a pair of adjacently disposed cut condensing lenses each adapted to direct a narrow elongated beam of convergent light rays through one of said outlet apertures and the tape portion drawn across said aperture, said beams emerging from said apertures along parallel axes, and a pair of mirrors disposed each in the path of one of said emergent beams at a region where said beams are closely associated, said mirrors being disposed with their reflecting surfaces diverging from a plane parallel to said beam axes and having their inner margins nearer to said plane than the inner rays of either beam, said mirrors being also disposed at different angles relatively to said plane and arranged to direct said beams divergently from each other and each toward one of said screens, and an objective lens in the path of the deflected portion of each beam between each of said mirrors and its cooperating screen.

8. A stock ticker projection machine comprising dual projecting means adapted to project illuminated images from a single tape upon spaced parallel screens, said machine including a common source of light for directing a main light beam, a pair of adjacent light apertures for receiving and dividing said light beam into two subordinate light beams, means for causing a tape successively to pass across said light apertures, a screen disposed at right angles to the portion of the tape crossing one of said light apertures, a mirror in the path of the subordinate light beam emerging from said latter portion of tape to direct the same at said screen, a second screen disposed at right angles to the portion of the tape crossing the other light aperture, and a second mirror disposed at an obtuse angle to the axis of the light beam emerging from the portion of the tape crossing the second light beam with its upper end disposed adjacent to the outer periphery of the first named light beam to direct the images by said second light beam onto said second screen whereby said mirrors may be compactly disposed relative to each other.

9. In a stock ticker projection machine, a ticker adapted to discharge marked tape, a projecting device including a common source of light and means for downwardly directing a main beam of light and a pair of parallel adjacent light apertures disposed adjacent to said light directing means for receiving said main light beam and dividing it into two subordinate light beams, a pair of screens disposed on opposite sides and facing said projecting device, a tape puller and said ticker disposed to one side of said light apertures, means for guiding the tape from one aperture to the other, said tape puller drawing the tape successively across said light apertures, the tape passing from the ticker, across the first aperture in one direction and across the second light aperture toward the tape puller in the opposite direction, a mirror disposed beneath each emerging subordinate light beam to deflect the images of the tape carried thereby to one of said screens, a common base on which said projecting device, ticker and tape puller are mounted, a rewind reel for receiving the tape from said tape puller, and means extending from the bottom of said base for rotatably mounting said reel.

10. In a stock ticker projection machine, a ticker adapted to discharge marked tape, a projecting device including a common source of light, means for directing a main beam of light emanating at said source, and a pair of adjacent light apertures disposed adjacent to said light directing means for receiving said main beam and dividing it into two subordinate light beams, a pair of opaque screens disposed on opposite sides and facing said projecting device, a tape puller and said ticker disposed to one side of said light apertures, means for guiding the tape from one aperture to the other with its printed side facing downwardly, said tape puller drawing the tape successively across said light apertures, the tape passing from the ticker across the first light aperture in one direction and across the second light aperture toward the tape puller in the opposite direction, a mirror disposed beneath the first light aperture and inclining outwardly away from the path of movement of the light beam emerging from the second light aperture to deflect the images of the tape carried by the light beam emerging from said first named light aperture onto one of said screens, and a second mirror disposed beneath the second light aperture and inclining outwardly away from the path of movement of the light beam emerging from said first light aperture and deflecting the images of the tape carried by the light beam emerging from said second light aperture onto the other of said screens.

11. A stock ticker projecting machine comprising a plurality of projecting means adapted to project illuminated images from a single tape upon a plurality of screens, said machine including a common source of light for forming a main light beam, means for directing said main beam downwardly, a plurality of horizontally disposed light apertures for receiving and dividing said main light beam into a plurality of subordinate light beams, means for successively drawing and guiding the tape across said light apertures with the printed side facing downwardly, a screen for each of said light apertures, and means for directing the image impressed light beam from each of said light apertures to one of said screens.

12. A stock ticker projecting machine comprising dual projecting means adapted to project image impressed light beams from a single tape upon two screens, said machine including a common source of light for forming a main light beam, means for directing said main light beam downwardly, two parallel horizontally disposed light apertures for receiving and dividing said main light beam into two subordinate light beams, means for successively drawing and guiding the tape across said light apertures with the printed side facing downwardly at each light aperture, a screen for each of said light apertures, and means for directing the image impressed light beam from each of said light apertures to one of said screens.

AUGUST D. EITZEN.